US011930983B2

(12) United States Patent
Schlief et al.

(10) Patent No.: US 11,930,983 B2
(45) Date of Patent: Mar. 19, 2024

(54) HOUSEHOLD APPLIANCE, IN PARTICULAR AQUIFEROUS HOUSEHOLD APPLIANCE

(71) Applicant: Miele & Cie. KG, Guetersloh (DE)

(72) Inventors: Martin Schlief, Werther (DE); Matthias Kupfer, Bielefeld (DE)

(73) Assignee: MIELE & CIE. KG, Guetersloh (DE)

( * ) Notice: Subject to any disclaimer, the term of this patent is extended or adjusted under 35 U.S.C. 154(b) by 0 days.

(21) Appl. No.: 18/263,136

(22) PCT Filed: Jan. 28, 2022

(86) PCT No.: PCT/EP2022/051989
§ 371 (c)(1),
(2) Date: Jul. 27, 2023

(87) PCT Pub. No.: WO2022/167329
PCT Pub. Date: Aug. 11, 2022

(65) Prior Publication Data

US 2024/0032770 A1 Feb. 1, 2024

(30) Foreign Application Priority Data

Feb. 8, 2021 (DE) ..................... 10 2021 102 827.2

(51) Int. Cl.
*A47L 15/42* (2006.01)
*E05F 15/611* (2015.01)
*E05F 15/73* (2015.01)

(52) U.S. Cl.
CPC ....... *A47L 15/4257* (2013.01); *A47L 15/4293* (2013.01); *E05F 15/611* (2015.01);
(Continued)

(58) Field of Classification Search
CPC ............. A47L 15/4257; A47L 15/4293; E05Y 2900/304
(Continued)

(56) References Cited

U.S. PATENT DOCUMENTS

2003/0030284 A1* 2/2003 Prada .................. A47L 15/4259 292/121
2011/0192430 A1* 8/2011 Baldwin ............. A47L 15/4257 134/137
(Continued)

FOREIGN PATENT DOCUMENTS

DE 102007033347 A1 8/2008
DE 102011053290 A1 5/2012
(Continued)

*Primary Examiner* — James O Hansen
(74) *Attorney, Agent, or Firm* — LEYDIG, VOIT & MAYER, LTD.

(57) ABSTRACT

A household appliance, in particular a water-using household appliance such as, for example, a dishwasher, includes: an appliance housing providing an appliance chamber, which appliance housing has a loading opening for access to the appliance chamber; and an appliance door which is mounted so as to be rotatable about a pivot axis for closing the loading opening, the appliance door having a door handle and a user control unit having a bezel and a control panel. The control panel is disposed on the bezel so as to be pivotable about an axis of rotation extending along a lower longitudinal edge of the control panel, in a vertical direction, being pivotable from a first position, in which the control panel is flush with an outer surface of the appliance door, to a second position, in which the control panel is moved into a cavity provided by the bezel, and vice versa.

8 Claims, 5 Drawing Sheets

(52) U.S. Cl.
CPC ........ *E05F 15/73* (2015.01); *E05F 2015/767* (2015.01); *E05Y 2900/304* (2013.01)

(58) Field of Classification Search
USPC ............................................... 312/228, 348.6
See application file for complete search history.

(56) References Cited

U.S. PATENT DOCUMENTS

| | | | | |
|---|---|---|---|---|
| 2012/0111366 | A1 | 5/2012 | Baldwin et al. | |
| 2015/0233038 | A1* | 8/2015 | Lee | D06F 37/268<br>312/228 |
| 2016/0076187 | A1* | 3/2016 | Lee | E05D 7/02<br>312/228 |
| 2019/0093388 | A1* | 3/2019 | Criner | E05B 1/0015 |
| 2020/0405121 | A1* | 12/2020 | Park | A47L 15/22 |

FOREIGN PATENT DOCUMENTS

| | | | |
|---|---|---|---|
| EP | 1795642 | B1 | 5/2012 |
| EP | 2941167 | B1 | 8/2018 |

* cited by examiner

HOUSEHOLD APPLIANCE, IN PARTICULAR AQUIFEROUS HOUSEHOLD APPLIANCE

CROSS-REFERENCE TO PRIOR APPLICATIONS

This application is a U.S. National Phase application under 35 U.S.C. § 371 of International Application No. PCT/EP2022/051989, filed on Jan. 28, 2022, and claims benefit to German Patent Application No. DE 10 2021 102 827.2, filed on Feb. 8, 2021. The International Application was published in German on Aug. 11, 2022 as WO/2022/167329 A1 under PCT Article 21(2).

FIELD

The invention relates to a household appliance, in particular a water-using household appliance such as, for example, a dishwasher, having an appliance housing providing an appliance chamber, which appliance housing has a loading opening for access to the appliance chamber, and having an appliance door which is mounted so as to be rotatable about a pivot axis for closing the loading opening. The invention further relates to a user control unit for a household appliance.

BACKGROUND

Household appliances in general, and water-using household appliances in particular, are per se well known in the art and therefore need not be specifically described herein. Merely by way of example, reference is made to DE 10 2011 053 290 A1, DE 10 2007 033 357 A1, and EP 1 795 642 B1, which describe a household appliance of the above-mentioned type.

In the context of the invention, a household appliance is in particular a water-using household appliance such as, for example, a dishwasher, a washing machine, and/or a dryer. However, the term "household appliance" also includes ovens, steam cookers, microwaves, and/or the like.

A household appliance of the above-mentioned type has an appliance housing providing an appliance chamber. The appliance housing has a loading opening for user access to the appliance chamber. To allow the loading opening to be closed during use of the household appliance, there is provided an appliance door which is disposed on the appliance housing such that it is pivotable about a pivot axis. During normal use, the appliance door can be moved by a user from an open position to a closed position closing the loading opening, and vice versa. In the case of a water-using household appliance, the loading opening is preferably closed in a fluid-tight manner by the appliance door in the closed position.

To allow user manipulation of the appliance door, the appliance door is provided with a door handle to be grasped by a user during use. Such a door handle may be, for example, a grip or a handle recess.

The appliance door of a household appliance of the above-mentioned type further has a user control unit. The user control unit serves to allow a user to put a household appliance to its intended use and to control the operation thereof. For this purpose, the user control unit has a control panel which, depending on the design of the household appliance, provides the respective user control functionalities. The control panel may, for example, be configured as a so-called touch panel. However, mechanically actuated buttons and/or knobs may also be provided by the control panel.

The control panel further has a bezel, which is disposed on the appliance door and provides the control panel. Accordingly, the bezel serves as a support unit for the control panel.

Modern kitchens feature a simple, reduced design. The appearance is dominated by large surfaces and small gap widths. Built-in appliances such as, for example, household appliances of the above-mentioned type, follow this trend with smooth, touch-control surfaces; i.e., without control knobs or buttons.

This desired, reduced design is contrasted by an appliance handle visibly mounted on the outside of an appliance door. Therefore, there is a desire to design an appliance door in a manner that substantially avoids protruding appliance components, such as door handles, projecting from the front of an appliance door.

SUMMARY

In an embodiment, the present invention provides a household appliance, in particular a water-using household appliance such as, for example, a dishwasher, comprising: an appliance housing providing an appliance chamber, which appliance housing has a loading opening for access to the appliance chamber; and an appliance door which is mounted so as to be rotatable about a pivot axis for closing the loading opening, the appliance door having a door handle and a user control unit having a bezel and a control panel, wherein the control panel is disposed on the bezel so as to be pivotable about an axis of rotation extending along a lower longitudinal edge of the control panel, in a vertical direction, being pivotable from a first position, in which the control panel is flush with an outer surface of the appliance door, to a second position, in which the control panel is moved into a cavity provided by the bezel, and vice versa, and wherein the door handle comprises a grip provided by the bezel on a cavity side which, when the control panel is in the second position, is accessible on a user side through an opening gap between the control panel and the bezel.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
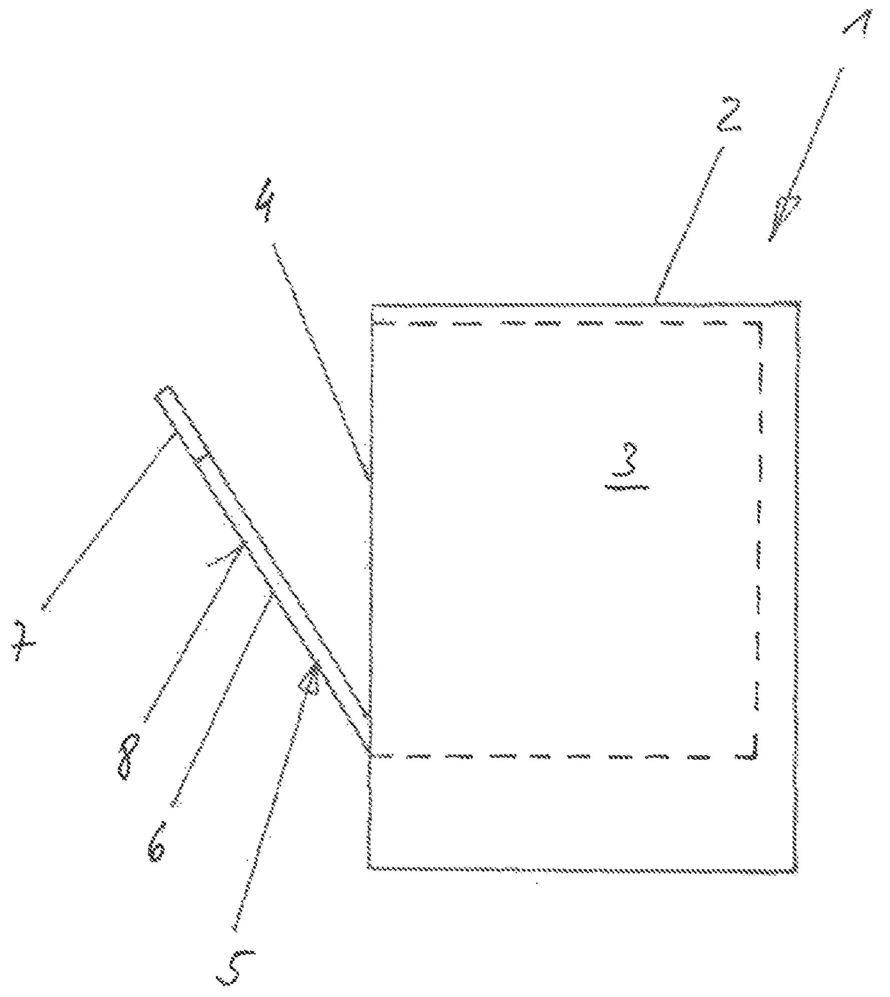
FIG. 1 is a purely schematic side view of an inventive household appliance in the form of a dishwasher.

In an embodiment, the present invention improves the design of a household appliance of the above-mentioned type in such a manner that an overall two-dimensional appearance is provided, at least when the appliance door is in the closed position, while at the same time improving handling by the user.

In an embodiment, the present invention provides a household appliance of the above-mentioned type which is characterized in that the control panel is disposed on the bezel so as to be pivotable about an axis of rotation extending along a lower longitudinal edge of the control panel, in the vertical direction, and can pivot from a first position, in which the control panel is flush with the outer surface of the appliance door, to a second position, in which the control panel is moved into a cavity provided by the bezel, and vice versa, and in that the door handle is a grip provided by the bezel on the cavity side which, when the control panel is in the second position, is accessible on the user side through an opening gap between the control panel and the bezel.

The user control unit according to the invention provides a pivotable control panel which, in the non-pivoted position, conceals a grip provided by the user control unit such that it is not visible to a user from the exterior. Thus, when the control panel is in the non-pivoted position, the inventive design provides a reduced, two-dimensional design without a visible door handle. The door handle is configured as a grip, preferably as a handle recess, and is concealed by the control panel when in the non-pivoted position. The door handle configured in this way is accessible to the user only when the control panel is in the pivoted position. In this connection, the control panel can be pivoted and, at the same time, the grip provided by the user control unit can be reached with a single movement of the user's hand. This simplifies handling and, at the same time, provides a reduced design since the grip, which serves as a handle, is concealed from the user's view in the non-pivoted position.

In accordance with the invention, the control panel is pivotably disposed on the bezel. The axis of rotation about which the control panel is pivotable extends along a longitudinal edge of the control panel, namely along the lower longitudinal edge in the vertical direction.

In accordance with the invention, the control panel can be pivoted from a first position to a second position and vice versa. In the first position of the control panel, called the non-pivoted or unpivoted position, the control panel is flush with the outer surface of the appliance door. In this position, the grip provided by the user control unit is located behind the control panel in the viewing direction of a user. Thus, in this position, the control panel conceals the grip, so that it is not visible. In this position of the control panel, an overall two-dimensional and thus reduced design of the appliance front is provided.

In order to move the control panel to the second position, the control panel must be pivoted, with its upper longitudinal edge opposite the lower longitudinal edge, into a cavity provided by the user control unit. Thus, at no point in time does the control panel project beyond the outer surface provided by the appliance door. In the first position, the control panel is flush with the outer surface, and in the second position, it is moved with its upper longitudinal edge into the cavity provided by the user control unit.

In accordance with the invention, the door handle is a grip provided by the bezel of the user control unit on the cavity side. In the simplest case, the grip provides or is a handle recess formed by the inner contour of the bezel itself. This grip is accessible to the user only when the control panel is in the second position, access being through an opening gap formed between the control panel and bezel in the second position of the control panel. This opening gap is closed when the control panel is returned from the second position to the first position, so that the control panel is flush with the outer surface of the appliance door and the grip or the handle recess is concealed from a user's view by the control panel.

Pivotable control panels are not unknown in the prior art. For example, DE 10 2007 033 347 A1, which was already mentioned at the outset, describes a household appliance having a door provided with a control panel above a door handle. The control panel provides a display device which is rotatable and can be moved by the user into an inclined position with respect to the control panel for improved readability when needed. When in the pivoted position, the display device described in this document projects beyond the outer surface of the appliance door. In addition, the bezel described therein does not perform any handle function. For the purpose of operating the appliance door, there is provided a separate door handle, which is disposed below the pivotable display device in the vertical direction.

DE 10 2011 053 290 A1 discloses a household appliance having a user interface in the handle. The handle is provided with a touch panel and can be pivoted from an inoperative position to an operative position, in which operative position the handle projects beyond the outer surface provided by the appliance door. The handle is disposed so as to be pivotable about an axis of rotation extending in the direction of an upper longitudinal edge of the handle in the vertical direction. This allows the control panel provided by the handle to be tilted toward a user, which improves readability.

Finally, EP 1 795 642 B1 describes a control panel which is also pivotable and which can be tilted toward a user for better readability. This is achieved by the control panel being pivotable about an axis of rotation extending in the direction of an upper longitudinal edge of the control panel in the vertical direction.

The previously known control panels have in common that, in at least one position, they project beyond the outer surface provided by the appliance door. In contrast, the inventive design proposes that when in the pivoted position, the control panel be moved into a cavity provided by the bezel of the user control unit, whereby it does not project beyond the outer surface of the appliance door. In the non-pivoted position, the inventive control panel is flush with the outer surface of the appliance door and thus does not project beyond it. Accordingly, the design according to the invention provides the advantage that it prevents the visual appearance of the overall design of the household appliance from being disturbed by a control panel projecting beyond the outer surface of the appliance door. In addition, a control panel that is pivoted out from the outer surface of the appliance door is prone to malfunction and damage and is easily soiled, in particular by dirt particles and/or debris falling down from a countertop located above the household appliance. These drawbacks are also overcome by the design according to the invention.

A further feature of the invention provides that the control panel be manually pivotable. To open the appliance door, a user can, for example with the back of his or her hand in a single movement, push the control panel from the vertical first position inwardly to a pivoted second position; i.e., into the cavity provided by the user control unit, and reach into the handle recess provided by the user control unit with one or more fingers, which then allows a pivoting movement of the appliance door. Thus, this allows for easy and safe manipulation of the appliance door, the handle recess being invisible when the control panel is in the non-pivoted position because it is concealed behind the non-pivoted control panel.

Another feature of the invention provides that the control panel be pivotable by actuator means, preferably by motor means. In this case, there is no need for manual operation, and the control panel is pivoted by actuator means. Such an actuator could be triggered, for example, capacitively with a touch of the control panel, a pressure exerted on the control panel, by a proximity sensor, or by a camera. Thus, pivoting of the control panel can be triggered very easily, and in particular also in a contact-free manner.

A further feature of the invention provides that in the second position, the control panel is locked in position by a latching mechanism. This prevents accidental pinching caused by the control panel pivoting back. In order for a user to pivot the control panel back to the first position, the user needs to operate the control panel again, for example, by pushing against it, or, in the case of a motorized embodiment, by re-triggering the drive mechanism. In this connection, it may be provided that the control panel bias a spring as it is moved from the first position to the second position, which spring, when released by the user, causes an automatic pivoting movement back to the first position.

Alternatively, or in combination therewith, another feature of the invention provides that the pivoting movement of the control panel be damped. This also serves to prevent pinching since the movement of the control panel back to the first position is delayed by the damping effect. In addition, such damping serves to prevent undesirable rattling of the control panel during movement of the appliance door.

Another feature of the invention provides that the pivoting movement of the control panel be blocked during a pivoting movement of the appliance door. Accordingly, pivoting of the control panel is only possible when the appliance door is in its closed position. In this connection, it may also be provided that the control panel be capable of being pivoted up to a certain gap opening width of the door. In any case, once this gap opening width is exceeded, the pivoting movement of the control panel is blocked, thereby preventing unwanted pivoting of the control panel when the appliance door is open. This in particular protects the control panel from being accidentally damaged.

A further feature of the invention provides that the control panel be pivotable depending on an appliance program performed by the household appliance during normal use. For example, the control panel may be pivoted when a user starts an appliance program or may be pivoted automatically upon completion of an appliance program performed in accordance with the intended use. For example, it may in particular be provided that the control panel automatically pivot from its first position to the second position upon completion of an appliance program performed during normal use. The completion of a properly performed appliance program is thus visually indicated to a user of the household appliance. Moreover, as a result of the pivoting of the control panel to the second position, the handle recess provided by the user control unit is cleared, thereby allowing a user to easily reach into it. Additionally or alternatively, it may be provided that the control panel, if in its second position, pivot automatically from the second position to the first position when the user starts an appliance program.

In accordance with another feature of the invention, the optionally provided damping of the control panel is performed in a speed-dependent manner. During a normal pivoting movement of the control panel caused by a user, there is no or very little damping. In contrast, when the appliance door is rapidly moved to its end position, the pivoting movement of the control panel about its axis of ration is damped to a greater degree.

In accordance with a further feature of the invention, a child safety feature is provided whereby pivoting of the control panel from the first position to the second position is blocked and remains blocked until enabled by fingerprint recognition or camera-based recognition. This ensures that unauthorized persons, in particular children, are not able to open the household appliance. This also makes it impossible for pets to open the household appliance.

The invention also provides a separately patentable user control unit for a household appliance, in particular a user control unit for a household appliance of the aforedescribed type, which user control unit has a bezel and a control panel and which is characterized in that the control panel is disposed on the bezel so as to be pivotable about an axis of rotation extending along a lower longitudinal edge of the control panel, in the vertical direction, and can pivot from a first position, in which the control panel is flush with the outer surface of the appliance door, to a second position, in which the control panel is moved into a cavity provided by the bezel, and vice versa, and in that a door handle is provided, the door handle being a grip provided by the bezel on the cavity side which, when the control panel is in the second position, is accessible on the user side through an opening gap between the control panel and the bezel.

The inventive control panel possesses the advantages mentioned earlier herein.

FIG. 1 shows, in schematic side view, an inventive household appliance in the form of a dishwasher 1. Dishwasher 1 has an appliance housing 2 providing an appliance chamber 3. Appliance housing 2 has a loading opening 4 for access to appliance chamber 3. Loading opening 4 can be closed by an appliance door 5 which is mounted so as to be rotatable about a pivot axis.

Appliance door 5 is provided at its front with a cover panel 6 in the form of a decorative panel providing an outer surface 8. Furthermore, a user control unit 7 is provided above cover panel 6 in the vertical direction of appliance door 5.

The inventive user control unit 7 is shown in different views in further FIGS. 2 through 7.

Figure 2:
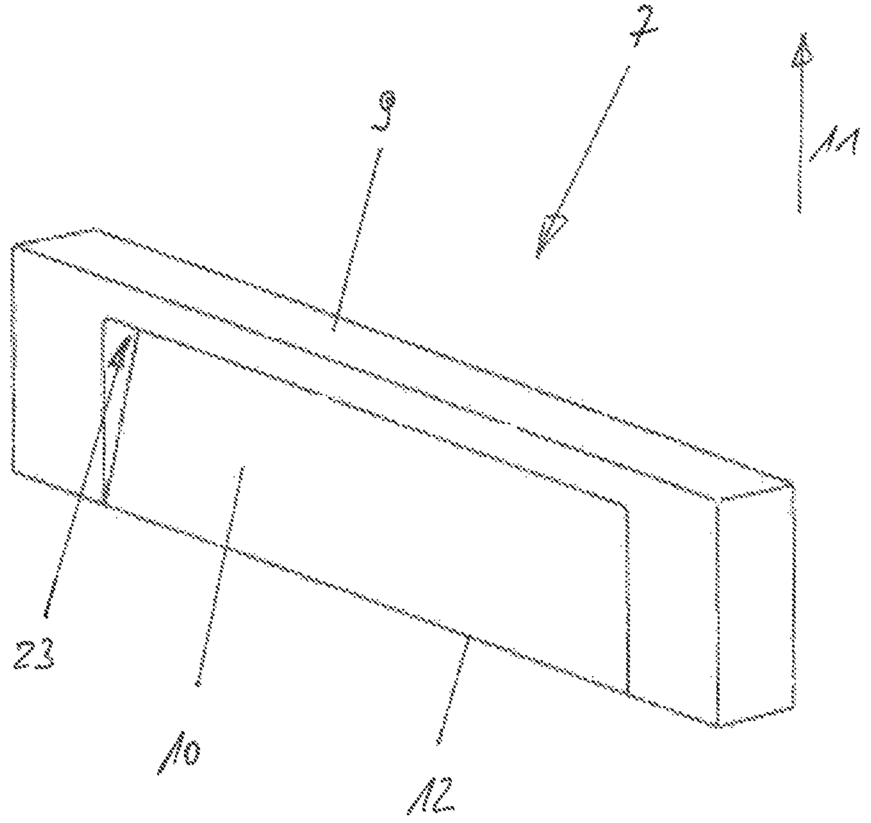
FIG. 2 is a schematic perspective view of a user control unit according to the invention.

As can be seen particularly from FIG. 2, user control unit 7 has a bezel 9 as well as a control panel 10. Control panel 10 is pivotal in relation to bezel 9, specifically about an axis of rotation 13 extending along a lower longitudinal edge 12 of control panel 10, in vertical direction 11. As can be seen particularly when viewing FIGS. 4 and 5 in conjunction for a first embodiment and viewing FIGS. 6 and 7 in conjunction for a second embodiment, control panel 10 can be pivoted from a first position (see FIG. 4 and FIG. 7, respectively) to a second position (see FIG. 5 and FIG. 6, respectively), and vice versa. In the first position, control panel 10 is not pivoted so that it is flush with outer surface 8 of appliance door 5. In the pivoted second position, control panel 10 is pivoted into a cavity 14 provided by bezel 9, whereby an opening gap 23 is formed between bezel 9 and control panel 10. FIG. 2 shows this pivoted position of control panel 10 and the resulting opening gap 23.

As can be seen when viewing FIGS. 4 through 7 in conjunction, bezel 9 is composed of a main body 15 and a front frame 16. Main body 15 and frame 16 are preferably formed as a single piece, for example, from plastic.

As can be seen from FIG. 2, frame 16 is, in this embodiment, U-shaped, so that lower longitudinal edge 12 of control panel 10 is flush with the lower edge of frame 16 in vertical direction 11. Alternatively, frame 16 may also be configured to form a circumferentially closed shape, so that one frame member extends below lower longitudinal edge 12 of control panel 10.

As can also be seen when viewing FIGS. 4 through 7 in conjunction, the transition region between main body 15 and frame 16 forms a grip 18 in the form of a handle recess. When control panel 10 is in the pivoted position, a user can reach with a finger 19 or with a plurality of fingers through the resulting opening gap 23 and behind frame 16, as can be seen particularly from the view of FIG. 5. This allows a user to pivot appliance door 5 and move it from a closed position to an open position. Frame 16, which is angled with respect to main body 15, thus provides an upper portion in vertical direction 11 that serves as a door handle for a user; i.e., as a grip 18 in the form of a handle recess.

Control panel 10 is preferably configured as a touch panel. The control electronics required for this is disposed on the back side of control panel 10 and pivots along with it when operated by a user, as can be seen from FIGS. 5 and 6.

Figure 4:
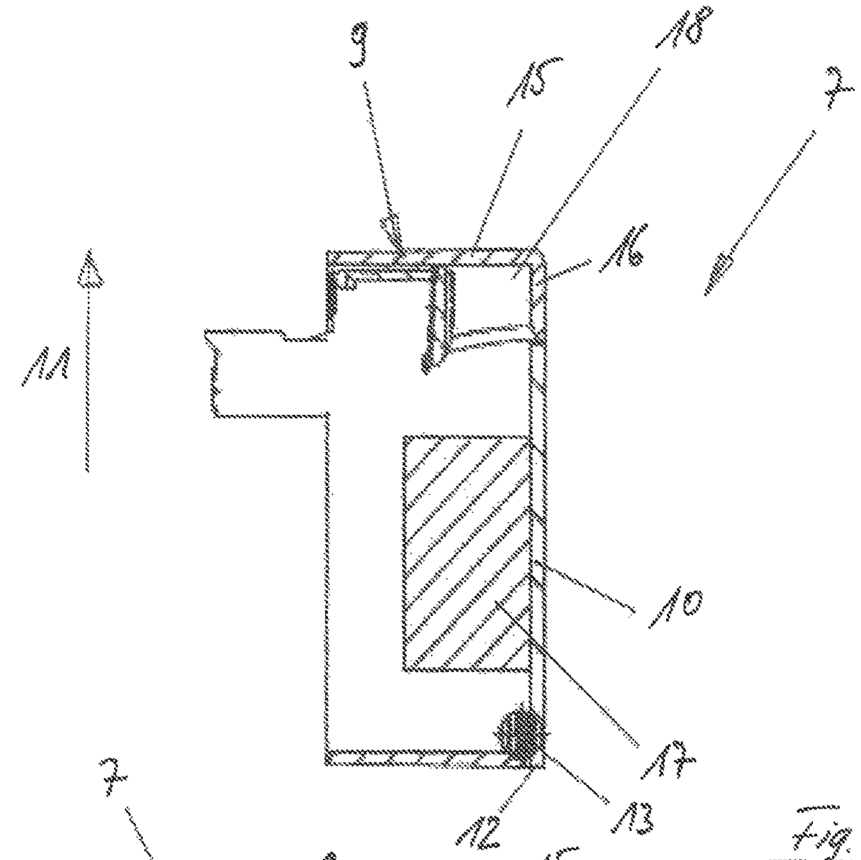
FIG. 4 is a schematic sectional view of an inventive user control unit according to a first embodiment with a non-pivoted control panel.
Figure 5:
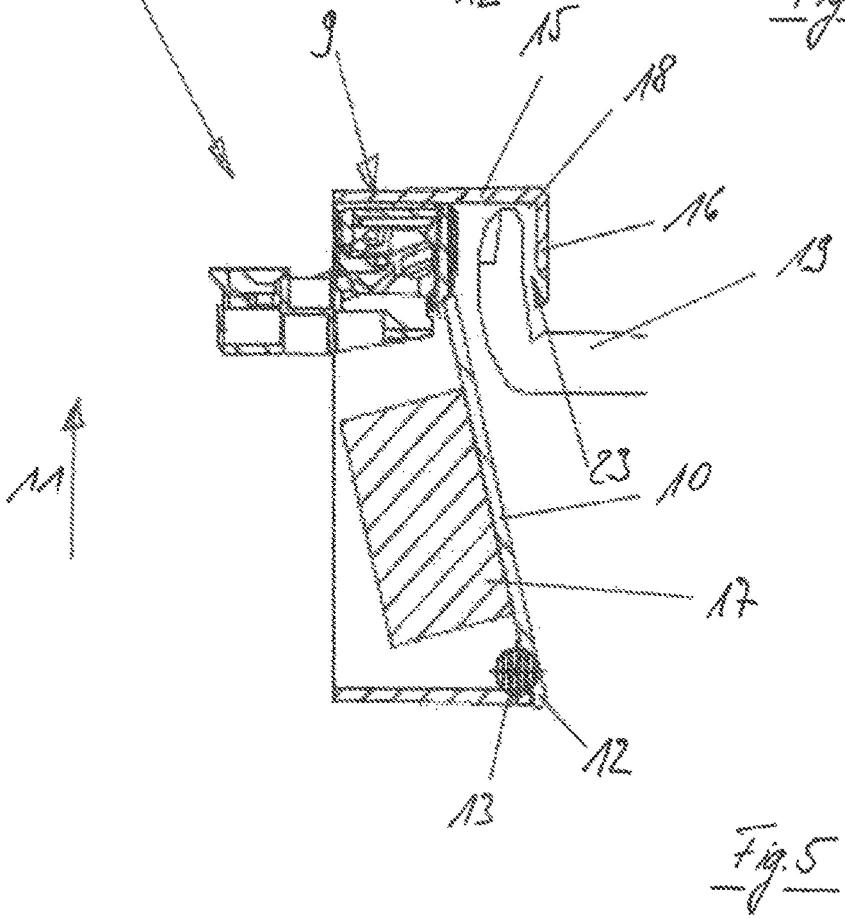
FIG. 5 is a sectional side view of the control panel of FIG. 4 with a pivoted control panel.
Figure 6:
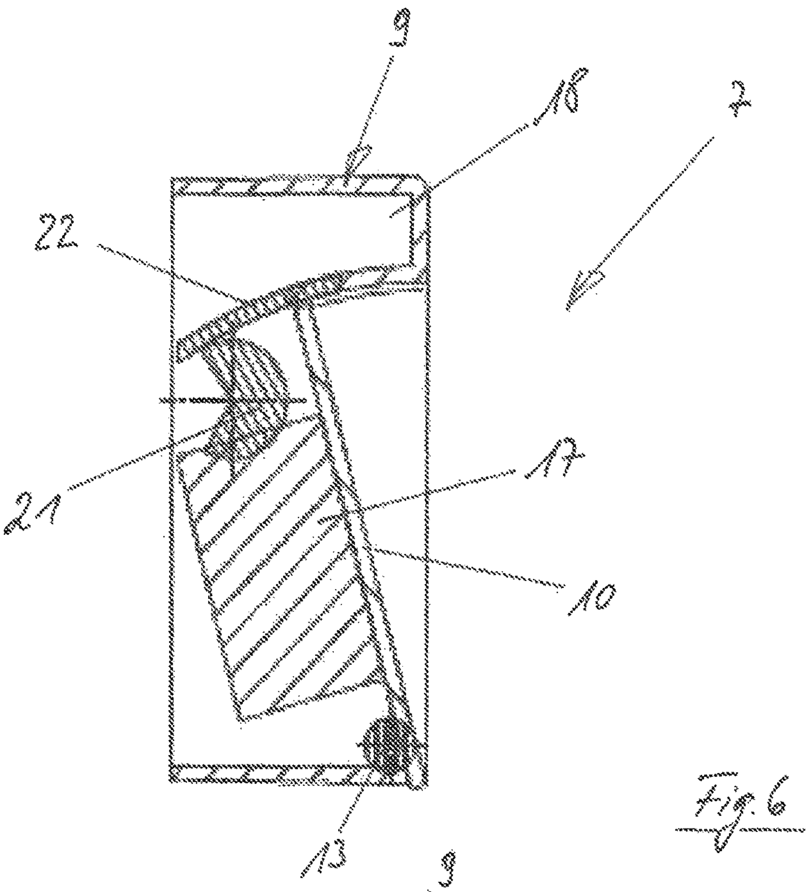
FIG. 6 is a schematic side view of an inventive control panel according to a second embodiment with a pivoted control panel.
Figure 7:
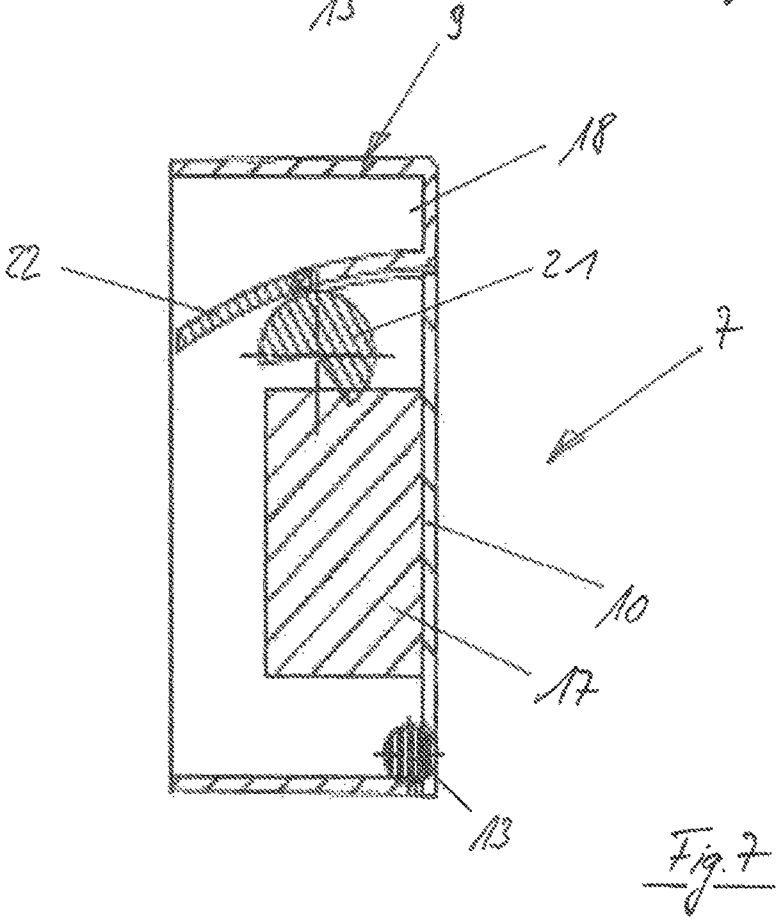
FIG. 7 is a sectional side view of the user control unit of FIG. 6 with a non-pivoted control panel.

The exemplary embodiment according to FIGS. 4 and 5 shows a design where control panel 10 needs to be manually pivoted by a user. FIGS. 6 and 7 show an alternative embodiment which provides for actuator-driven pivoting of control panel 10. For this purpose, a motor (not specifically shown in FIGS. 6 and 7) is provided as part of control electronics 17. When in use, the motor drives a drive roller 21, which in turn cooperates with a mating surface 22 provided by the bezel. Thus, when operated, drive roller 21 rolls against mating surface 22, which allows control panel 10 to be moved from the first position shown in FIG. 7 to the second position shown in FIG. 6, and vice versa, depending on the direction of rotation of the motor unit.

Figure 3:
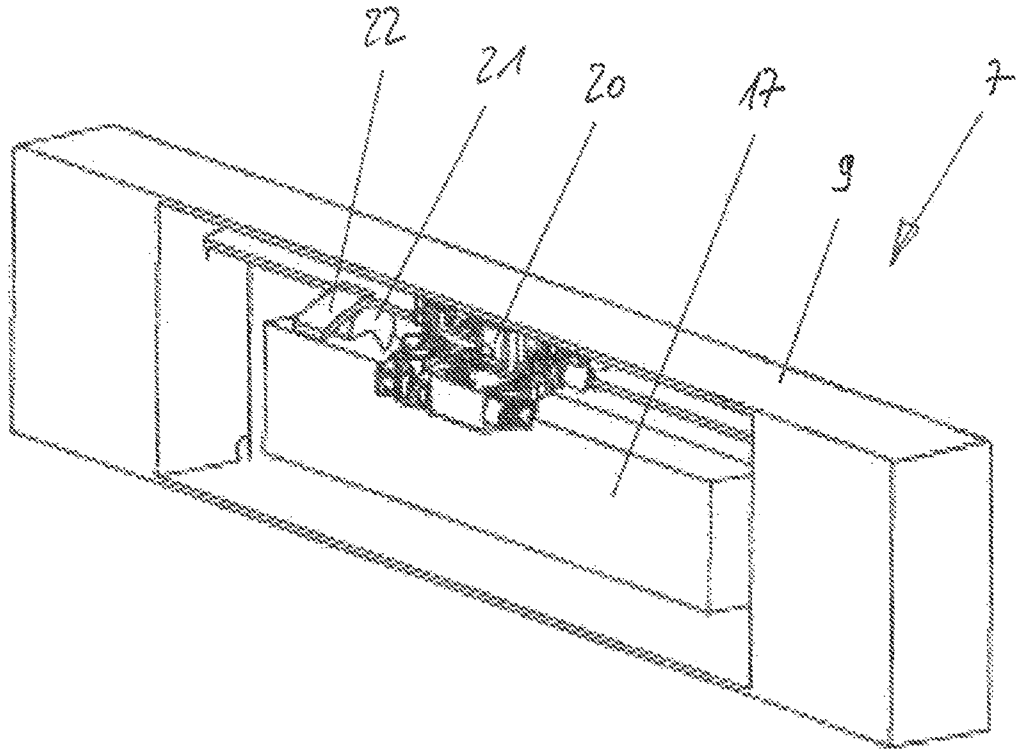
FIG. 3 is a schematic perspective view of an inventive user control unit without the control panel.

The cooperation of roller 21 and mating surface 22 can also be seen from the schematic view of FIG. 3, in which control panel 10 is not shown for the sake of clarity.

FIG. 3 further shows the latch 20 of a door lock provided for appliance door 5. Control panel 10 is preferably operatively connected to this latch 20 so that the operation of control panel 10 is blocked when appliance door 5 is not in the closed position. Accordingly, pivoting of the control panel is only possible when appliance door 5 is in the closed position and the latch assumes the corresponding position. Otherwise, pivoting of the control panel is not possible, which helps prevent accidental damage to control panel 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 dishwasher
2 appliance housing
3 appliance chamber
4 loading opening
5 appliance door
6 decorative panel (cover panel)
7 user control unit
8 outer surface
9 bezel
10 control panel
11 vertical direction
12 longitudinal edge
13 axis of rotation
14 cavity
15 main body
16 frame
17 control electronics
18 grip (door handle)
19 finger
20 latch
21 drive roller
22 mating surface
23 opening gap

The invention claimed is:

1. A household appliance, comprising:

an appliance housing providing an appliance chamber, which appliance housing has a loading opening for access to the appliance chamber; and an appliance door which is mounted so as to be rotatable about a pivot axis for closing the loading opening, the appliance door having a door handle and a user control unit having a bezel and a control panel, wherein the control panel is disposed on the bezel so as to be pivotable about an axis of rotation extending along a lower longitudinal edge of the control panel, in a vertical direction, being pivotable from a first position, in which the control panel is flush with an outer surface of the appliance door, to a second position, in which the control panel is moved into a cavity provided by the bezel, and vice versa, and wherein the door handle comprises a grip provided by the bezel on a cavity side which, when the control panel is in the second position, is accessible on a user side through an opening gap between the control panel and the bezel.

2. The household appliance of claim 1, wherein the control panel is manually pivotable.

3. The household appliance of claim 1, wherein the control panel is pivotable by actuator means.

4. The household appliance of claim 1, wherein in the second position, the control panel is locked in position by a latching mechanism.

5. The household appliance of claim 1, wherein a pivoting movement of the control panel is blocked by a latching mechanism during a pivoting movement of the appliance door.

6. The household appliance of claim 1, wherein the control panel is pivotable depending on an appliance program performed by the household appliance during normal use.

7. The household appliance of claim 1, wherein the household appliance comprises a water-using household appliance.

8. The household appliance of claim 7, wherein the water-using household appliance comprises a dishwasher.

* * * * *